United States Patent Office 3,436,175
Patented Apr. 1, 1969

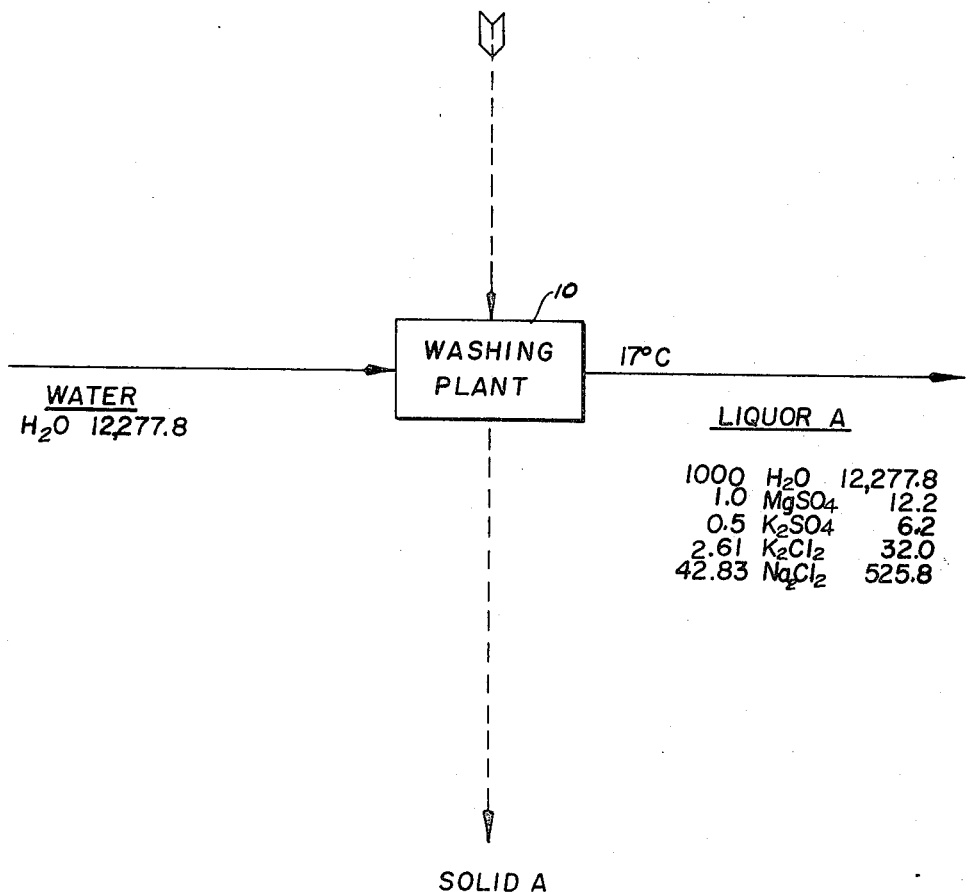

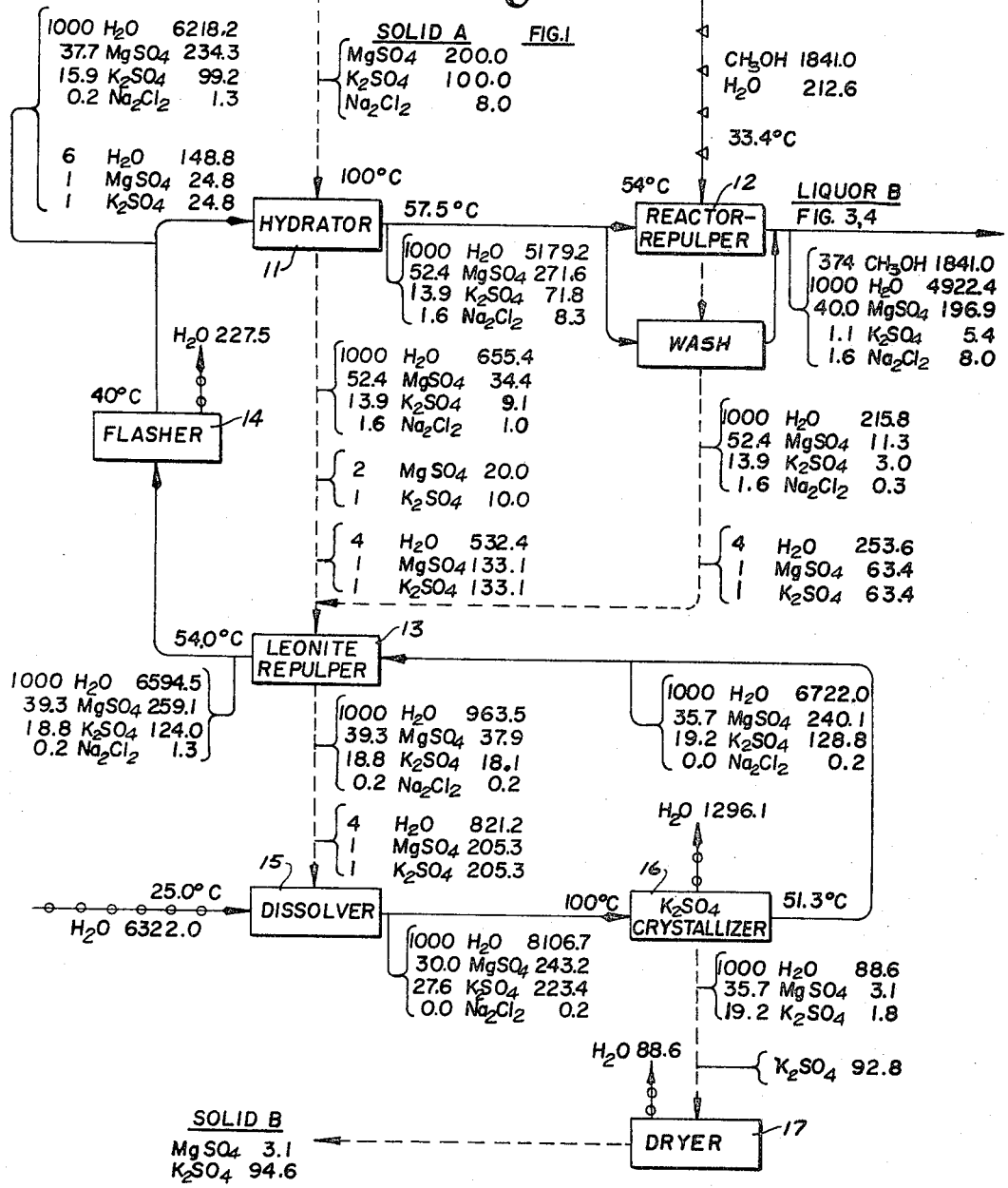

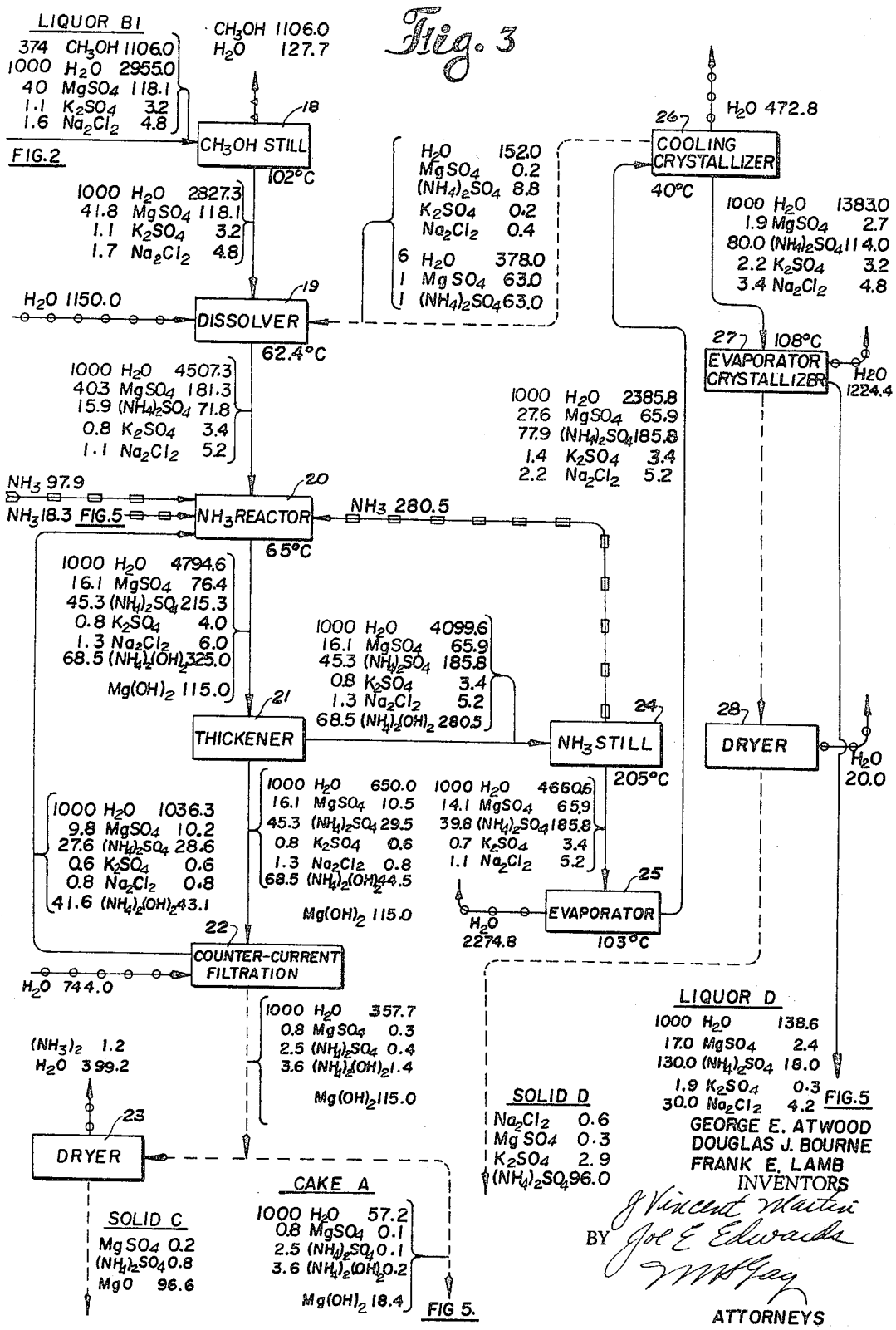

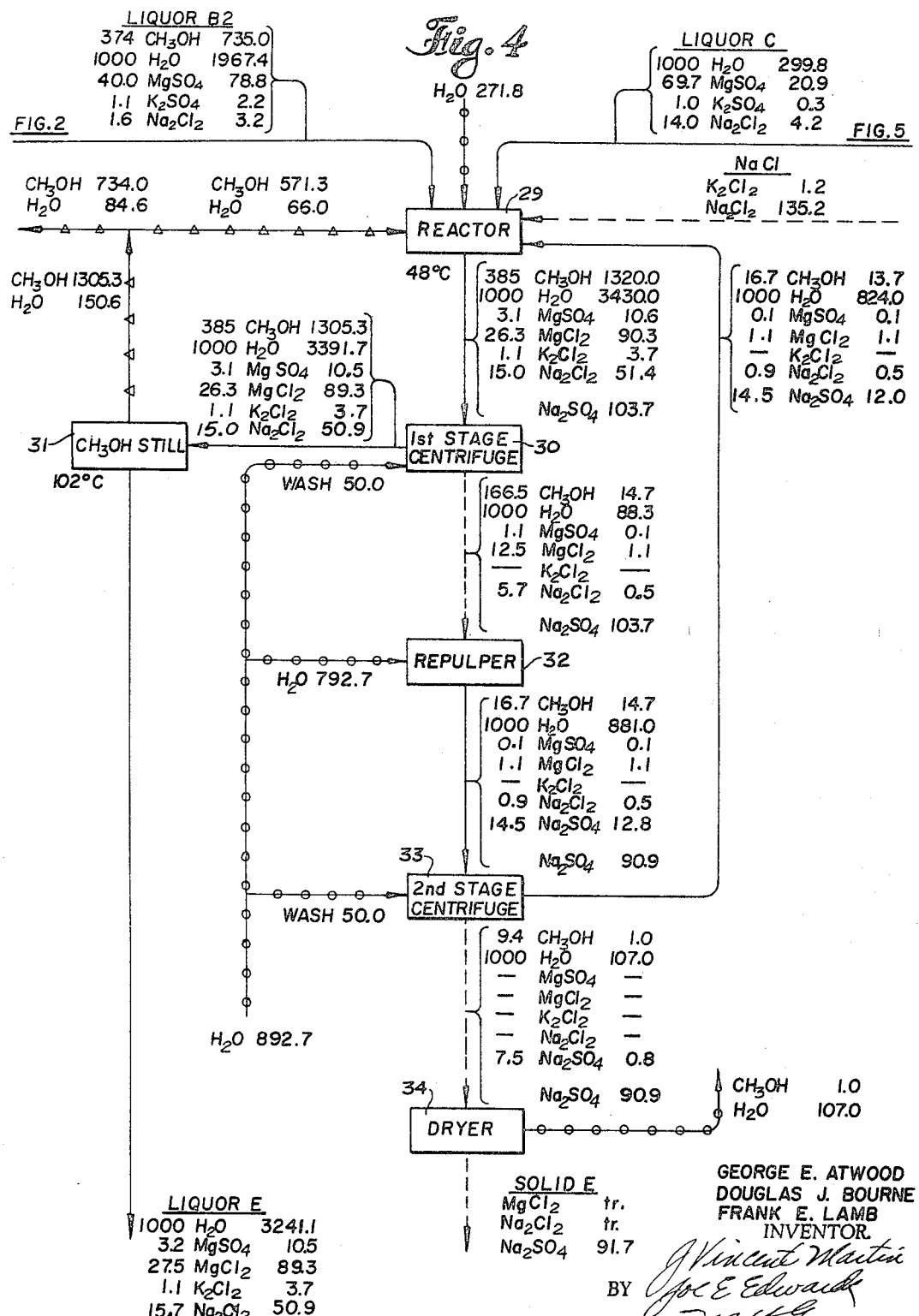

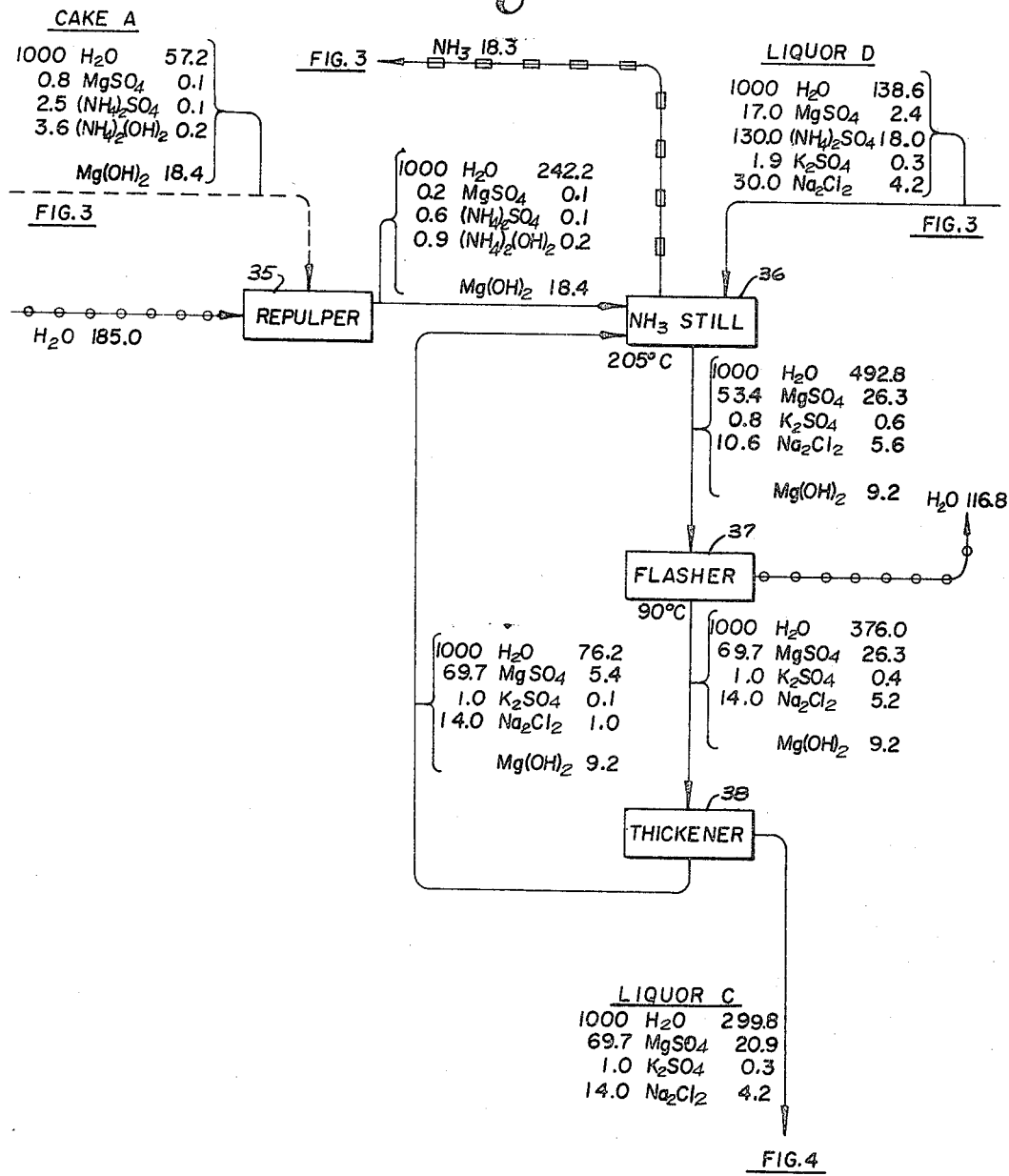

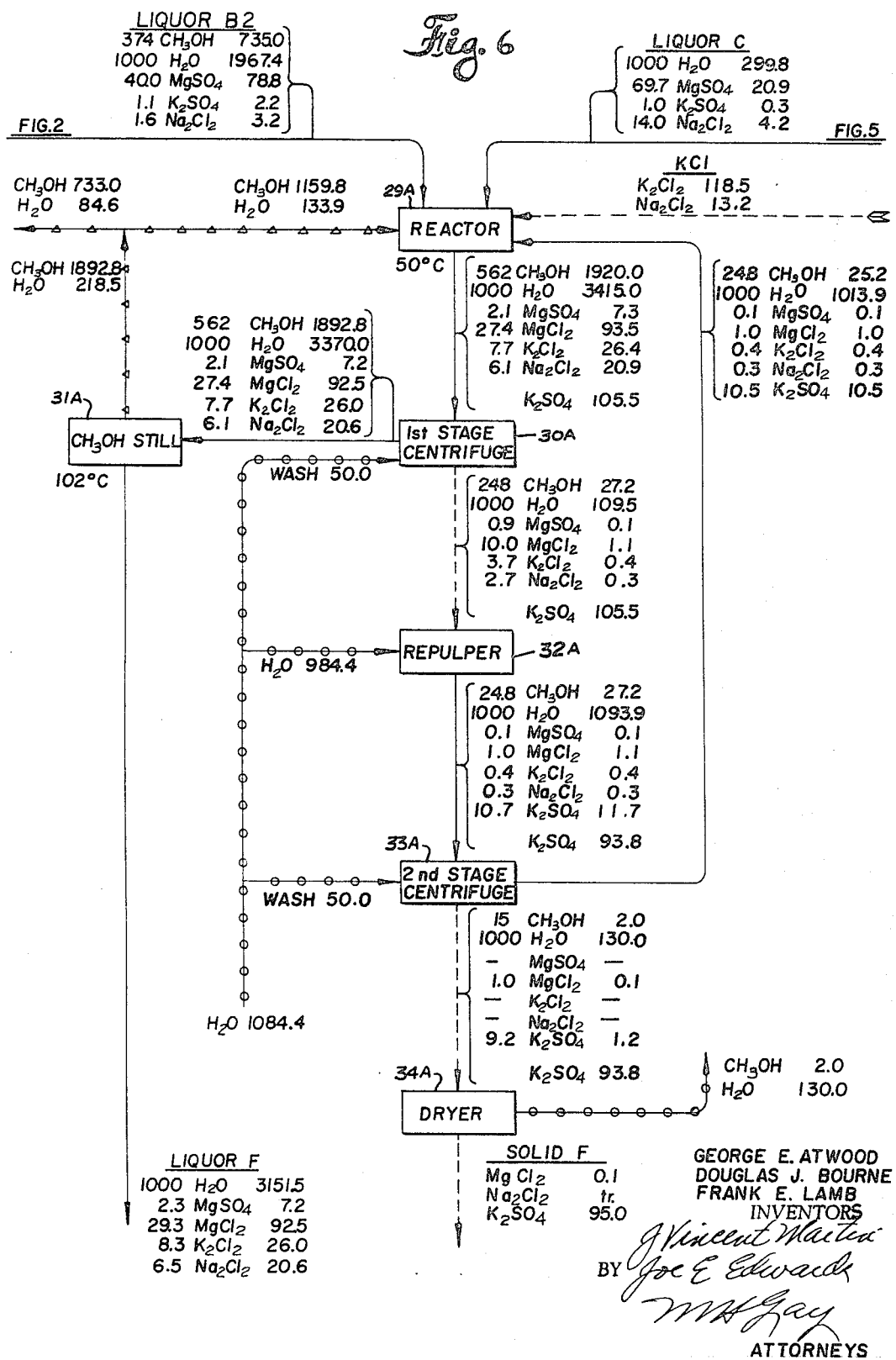

3,436,175
METHOD OF PRODUCING AMMONIUM SULFATE, POTASSIUM SULFATE AND MAGNESIUM OXIDE FROM LANGBEINITE
George E. Atwood, Sahuarita, Ariz., and Douglas J. Bourne and Frank E. Lamb, Carlsbad, N. Mex., assignors to Duval Corporation, Houston, Tex., a corporation of Texas
Filed June 19, 1964, Ser. No. 376,316
Int. Cl. C01c 1/24; C01d 5/00; C01f 5/02
U.S. Cl. 23—119          17 Claims This invention relates to processes for the manufacture of useful products from langbeinite ore.

Fertilizer products normally manufactured from langbeinite ores have relatively low concentrations of chloride. This is a desirable quality because chloride is frequently toxic to certain plants. The minimum specifications for chloride have been difficult to attain with existing processes which generally require the addition of potassium chloride in order to make adequate separations and reasonable recoveries of potassium sulfate. Once the chloride ion has been added, further processing of sulfate for other products and further processing of magnesium is made difficult.

Other processes which depend on aqueous systems for countercurrent hydration of langbeinite are limited in separation efficiency to the laws of solubility chemistry and such processes have definite shortcomings with respect to recovery.

An object of this invention is to provide a new and novel process for treating langbeinite ore to obtain therefrom useful products such as potassium magnesium sulfate, potassium sulfate, magnesium hydroxide and/or magnesia, ammonium sulfate and sodium sulfate.

Another object is to provide a new and novel process of producing potassium from langbeinite with high efficiency and without extensive evaporation of water.

Another object of this invention is to provide a new and novel process for the efficient separation of the potassium sulfate and the magnesium sulfate found in langbeinite without the addition of other salts, particularly a chloride.

A still further object of this invention is to provide a process for the production of magnesium hydroxide of exceptional purity and having excellent settling and filtration rates.

Another object of this invention is to provide a process for the almost total recovery of the sulfate values in langbeinite through combination with ammonia and/or sodium.

Another object of this invention is to provide a process for the production of sodium sulfate from the decomposition of langbeinite wherein either solid sodium chloride or a solution thereof may be used.

Another object of this invention is to provide a process for the production of sodium sulfate from the decomposition of langbeinite wherein the intermediate production of Glauber salts is obviated and the relatively expensive evaporation of water is eliminated.

Another object of this invention is to provide a process wherein potassium chloride can be substituted for the sodium chloride in previous objects.

Another object of this invention is to provide a process for the manufacture of useful products from langbeinite wherein ammonia recovery is greatly increased by stripping ammonium sulfate solutions with magnesium hydroxide.

Other objects of this invention will be apparent from a reading of the specification and a study of the accompanying drawings forming a part thereof and wherein FIGURES 1 through 6 are flowsheets and material balances illustrating the various phases of the process.

In the drawings, the solid flow lines indicate liquids or solutions, the dashed flow lines are filter cakes or dry solids, the lines identified with circles are water, those identified with squares are ammonia and those identified with triangles are methanol. Where process materials are in liquid form, the numbers to the left of the chemical components indicate solution concentrations in mols per 1000 mols of water. Where process materials are solid, a numerical description to the left of the chemical components shows the mol ratio of the constituents. In all cases, the numbers to the right of the chemical component are total mols and these constitute the material balance from step to step throughout the process. The basis for the overall balance is 100.0 mols of washed langbeinite (Solid A).

Considering the processes of this invention briefly, the first phase of the process (FIGURE 1) involves the water leaching of langbeinite ore to obtain solid A which is essentially pure langbeinite and Liquor A which is an aqueous solution essentially saturated with sodium chloride and containing minor amounts of the other soluble ore constituents.

Solid A, any portion of which may be marketed as a finished fertilizer chemical, is directed to the second phase of the process which is depicted in FIGURE 2. This phase involves the countercurrent hydration of langbeinite wherein the potassium sulfate is crystallized and the magnesium sulfate is dissolved in the liquor. Heretofore, this type process, as taught by U.S. 2,849,287, has depended upon extensive evaporation of water to provide a reasonable potassium recovery. In the second phase of this invention, the addition of the co-solvent alcohol selectively depresses the potassium sulfate solubility to a point where efficiencies of 95% are readily obtainable. FIGURE 2 shows the production of high quality potassium sulfate as Solid B and the relatively pure magnesium sulfate solution as Liquor B.

In the third phase of the process (FIGURE 3), a portion of Liquor B (FIGURE 2) is distilled for alcohol removal. The resulting relatively dilute aqueous solution is used to dissolve a recycling double salt containing additional magnesium sulfate. This solution is reacted with ammonia to precipitate magnesium hydroxide. The precipitate is separated from the mother liquor in a two stage countercurrent filtration step and is then dried and calcined to desired grade as depicted by Solid C. The mother liquor is stripped of ammonia, evaporated to saturation, cooled to precipitate the magnesium sulfate double salt for recycle and then sent to an evaporator crystallizer for the production of ammonium sulfate, Solid D, and its mother liquor, Liquor D.

The production of sodium sulfate, Solid E, is illustrated in FIGURE 4. The unused portion of Liquor B from FIGURE 2 is designated as Liquor B2 and this stream is directed to a reactor crystallizer. Sodium chloride either as a saturated aqueous solution or as a solid is also added to the reactor along with such other process streams as may be expedient in the overall material balance. In the material balance depicted by FIGURE 4, the sodium chloride is added as a solid to reduce the quantity of alcohol required for solubility control. A crystal product of sodium sulfate is separated from the reaction vessel liquor. After two stage countercurrent filtration, the crystals are dried and discharged as Solid E. The liquor from the reaction vessel is stripped of alcohol and either discharged to waste or concentrated for recovery of dissolved solids.

FIGURE 5 shows a flowsheet and material balance for the recovery of ammonia, magnesium sulfate and sodium chloride from the mother liquor, Liquor D, of the ammonium sulfate crystallizer. This solution is reacted with a minor portion of the magnesium hydroxide filter cake which is designated Cake A in FIGURE 3. The products of this step in the process are ammonia for recycle and Liquor C, which is directed to the reactor of FIGURE 4 for recovery of its sodium sulfate values.

In an integrated process as depicted by the illustrations already discussed, it is often highly advantageous to incorporate a measure of flexibility to the related product tonnages so that changes in individual markets may be accommodated by process versatility. One such advantage is depicted by FIGURE 6. Therein illustrated is a flowsheet for the substitution of potassium for sodium in the identical process steps and equipment of FIGURE 4. The reactions follow the same basic pattern and in such manner provide a strong measure of process flexibility.

FIGURES 1 through 6 illustrate a particular and specific material balance. The balance has been adjusted to reflect practical liquid solid separations to be expected in actual operation with conventional equipment. The flowsheets have also been adjusted to account for a detailed heat balance and temperatures, as indicated, accurately represent the effects of sensible heat, heats of solution and crystallization, vaporization and condensation. Also, the overall material balance is based on langbeinite ore from the Carlsbad, N. Mex. area which has the following typical analysis:

|  | Percent by wt. |
|---|---|
| Langbeinite ($K_2SO_4 \cdot 2MgSO_4$) | 40 |
| Halite ($Na_2Cl_2$) | 56 |
| Sylvite ($K_2Cl_2$) | 4 |
| Clay | Trace to 1 |
| Leonite ($K_2SO_4 \cdot MgSO_4 \cdot 4H_2O$) | Trace |
| Kieserite ($MgSO_4 \cdot H_2O$) | Trace |

The components of the solids and liquors shown in the drawings are the ions which have been hypothetically grouped in pairs by the standard method in which it is assumed that all of the sulfate ion is first combined with magnesium and any excess then combined with potassium; should the magnesium be in excess, this excess is combined with chloride; the remaining cations are then balanced with the remaining chloride ions.

Considering the process of the invention in detail beginning with FIGURE 1, the langbeinite ore is leached in a washing plant 10 which is of well known construction providing for the flow of fresh water countercurrent to the ore. The amount of water used in the leaching and the time of contact of the water and the ore are controlled in the well known manner so that the Solid A which is produced is essentially pure langbeinite and the Liquid A contains only relatively small amounts of the slowly soluble magnesium and potassium sulfates. The material balance depicted in FIGURE 1 indicates a recovery of better than 94% of the langbeinite at a purity of better than 97%. It will be appreciated that variations in time, equipment and the relative quantity of leach water will alter both purity and recovery. Liquor A resulting from the process step is at a temperature below ambient due to the negative heat of solution of the chlorides, and this stream can be effectively and economically used to cool subsequent process steps such as for barometric condensation of the vapors from the flasher 14 of the FIGURE 2.

In FIGURE 2, the washed langbeinite Solid A joins a slurry from a subsequent step in hydrator 11 where leonite is the stable solid phase. In hydrator 11, all the schoenite and a large portion of the langbeinite are converted to leonite. The leonite solids cake so produced is separated from the liquor and directed to the leonite repulper 13. The liquor contains some 52 mols of $MgSO_4$ and 14 mols of $K_2SO_4$ per 1000 mols of water and provides a solution in which rapid and nearly complete reaction of the langbeinite is allowed. This hydration mother liquor is sent to the reactor-repulper 12 where a recycling stream of liquid methanol is also added. The co-solvent effect of the methanol-water solution is such as to markedly reduce the potassium sulfate solubility while maintaining high solubility for both magnesium sulfate and the sodium chloride impurity. The stable solid phase containing potassium sulfate is the double salt leonite. The leonite solids so crystallized are separated as a filter or centrifuge cake and directed to the leonite repulper 13. Two-stage centrifugation using intermediate repulping and washing with the liquor from hydrator 11 (leonite stable) is recommended to minimize the loss of methanol with the leonite cake. The filtrate or effluent from reactor-repulper 12, designated Liquor B, is a concentrated and relatively pure $MgSO_4$ solution and is stored for feed to subsequent process sections.

The hydrator 11 and reactor-repulper 12 could be combined in one vessel but control of crystal growth would be more difficult and smaller crystals would tend to be produced. Of course, the liquor from the leonite repulper would be used to wash the crystals and displace the methanol liquor which would be the same as Liquor B.

The leonite cakes from both hydrator 11 and from reactor-repulper 12 are combined in the leonite repulper 13 with a recycle liquor from a subsequent step. In this reactor all unreacted langbeinite is readily converted to leonite in the mother liquor which contains less than about 40 mols of $MgSO_4$ per 1000 mols of water. The leonite solids are filtered or centrifuged and the cake is sent to the dissolver 15. The mother liquor from the leonite repulper 13 is sent to flasher 14 or other device for temperature control. In flasher 14, sufficient water is evaporated to drop the temperature to about 40° C. and in so doing a minor amount of schoenite is precipitated. The schoenite slurry is directed to the hydrator 11 where it joints the langbeinite feeding the process section.

The leonite cake from the leonite repulper 13 is dissolved in dissolver 15 by adding water and heat in any desirable manner such as injecting steam. The hot solution is directed to the cooling crystallizer 16 where potassium sulfate is produced in a manner designed to yield a high purity, easily filtered, free flowing product. The cake from crystallizer 16 is dried in dryer 17 and the product is designated Solid B. The filtrate or effluent from crystallizer 16 is directed to the leonite repulper for the conversion of any unreacted langbeinite.

Referring to FIGURE 3, a portion of liquor B is designated Liquor B1 and is directed to methanol still 18 where methanol is readily stripped from the remaining aqueous magnesium sulfate solution. Inasmuch as the methanol product from the still 18 is recycled back to aqueous solution reactions, its purity is in no way critical and as much water may be taken with the methanol as desired, the only limit being heat balance considerations. Another attractive feature of the distillation step is that as alcohol is removed, the resulting aqueous solution becomes less and less saturated so that no problems of inadvertent crystallization are involved.

The still bottoms together with a recycling double salt of magnesium ammonium sulfate and additional water is added to dissolver 19. The liquor effluent is directed to the ammonia reactor 20 where the addition of liquid and gaseous ammonia causes the precipitation of magnesium hydroxide. These reactants together with recycling filtrate are thickened in thickener 21. The underflow or thickened solids are subjected to multistage countercurrent filtration 22 to minimize the loss of free ammonia. The filter cake is divided, the major portion is dried in dryer 23 to desired magnesium hydroxide or magnesia specification and such product is designated Solid C. The remainder of the filtered solids is designated Cake A and is used in a subsequent process step.

The overflow from thickener 21 is pumped to the ammonia still 24 where the aqueous solution is readily stripped of uncombined ammonia which is recycled back to the reactor 20. The then unsaturated bottoms from still 24 are concentrated in evaporator 25 and directed to the cooling crystallizer 26. The filtered or centrifuged solids from the crystallizer are returned to dissolver 19 while the effluent is directed to evaporator-crystallizer 27.

The recycling solids represent a circulating load of magnesium sulfate which maintains the excess magnesium concentration in the reactor 20 which will result in the precipitation of magnesium hydroxide essentially equal to the total magnesium in the feed to this process section. By this adroit manipulation of these solutions, the effluent from cooling crystallizer 26 is a relatively concentrated ammonium sulfate solution which is practically devoid of magnesium. This solution is further concentrated in the evaporator crystallizer 27 to a point just short of solid phase stability of any of the contaminants, i.e., sodium chloride. This concentration causes the crystallization of a coarse crystalline ammonium sulfate product which is centrifuged and dried and designated Solid D. The mother liquor from crystallizer 27 is liquor D, which is subject to further processing for salvage of its solute.

FIGURE 4 shows a stage of the process wherein a portion of Liquor B, designated Liquor B2, is reacted in reactor 29 with Liquor C (from FIGURE 5) and sodium chloride. Additional methanol is also added for desired solubility control. As depicted in FIGURE 4, the sodium chloride is added as an impure dry solid such as might be available from a muriate of potash refinery tailing. It should again be noted, however, that a near saturated salt solution such as might be available from a brine well could also be used if adjustments in alcohol addition were made. The products of reactor 29 are crystalline sodium sulfate and a methanol-water solution essentially stripped of sulfate values. The solids from reactor 29 are filtered or centrifuged from the mother liquor in centrifuge 30. The mother liquor is pumped to still 31 for removal of the methanol which is recycled to process. Here again the quality of the methanol product can be degraded with water without serious effect to the overall process. The stripped bottoms from the still are designated Liquor E, which may be either discarded to waste or sent to such other processing as may be desired for salvage of solute values. A preferred scheme is depicted where two-stage centrifugation with intermediate repulping in water is conducted in centrifuge 30, repulper 32 and centrifuge 33 with the filtrate from centrifuge 33 recycled to reactor 29. These steps provide for both improved product purity and maximum alcohol recovery. The final solid is high purity sodium sulfate which is dried in dryer 34 and designated Solid E.

A desirable recovery step is shown in FIGURE 5. In this drawing the mother liquor, Liquor D, from the ammonium sulfate crystallizer (FIGURE 3) is laden with valuable solute. To recover this solute in a usable manner, Cake A (from FIGURE 3) is pulped in water in repulper 35 and fed to still 36 together with Liquor D and some recycling magnesium hydroxide. The resulting solution is flashed in Flasher 37 to remove water and sent to Thickener 38. The underflow from the thickener is recycled to the still 36 and the overflow (Liquor C) directed to reactor 29 (FIGURE 4) to recover the sulfate values. By use of the magnesium hydroxide, in excess of stoichiometric quantity, as an alkali the ammonia is freed and easily stripped from the slurry while the magnesium combines as a soluble sulfate. The neatness of the reaction and its ease of operation can be appreciated when comparison is made with the reaction when lime is used as the stripping alkali. In this case the residue is a precipitate of gypsum or anhydrite which coats the trays or packing of the still and necessitates impractical cleaning cycles as well as loss of sulfate. Through the use of the recovery process of FIGURE 5, the ammonia content of Liquor D is recovered and recycled to process in reactor 20 and the sulfate content of Liquor D is recovered as additional sodium sulfate product through reactor 29.

FIGURE 6 shows a modification of the process section already described in FIGURE 4. In the modification, potassium chloride such as is readily available as a fertilizer chemical, is substituted for sodium chloride. The reaction is carried out in identical equipment with only minor variations in liquor analysis such that in reactor 29A potassium sulfate is formed. This crystalline product is then subjected to a two-stage centrifugation with an intermediate water repulp in centrifuge 30A, repulper 32A and centrifuge 33A. The cake is dried in dryer 34A to the potassium sulfate product Solid F which is of high purity and may be combined with Solid B for sale as a chemical or fertilizer commodity. The liquor from reactor 29A is stripped of methanol in still 31A. The alcohol is reused in process while the bottoms Liquor F is discarded to waste or reprocessed for recovery of solute values.

It will be appreciated by those skilled in the art that the process of this invention involves the variables of time, temperature, quantities and concentrations and, while a specific flow sheet and material balance has been shown in the drawings, said flow sheet is only illustrative thereof and departures may be easily made within the ranges of the limits of solubility chemistry to produce the products indicated without departing from the spirit of this invention.

In all cases, as depicted in the drawings, the liquor concentrations have been selected so that reactions occur well away from critical phase boundaries where actual plant operation is difficult.

What is claimed is:

1. The process of producing leonite from an aqueous solution of magnesium potassium sulfate comprising the steps of:
   mixing the solution with methanol to crystallize leonite, and
   separating the leonite from the mother liquor.

2. The process of producing potassium sulfate from an aqueous solution of magnesium potassium sulfate comprising the steps of:
   mixing the solution with methanol to crystallize leonite,
   separating the leonite from the mother liquor,
   dissolving the leonite in water,
   removing water from the leonite solution to crystallize potassium sulfate from the solution, and
   separating the potassium sulfate from the solution.

3. The process of producing leonite from langbeinite comprising the steps of:
   hydrating langeinite with water to dissolve substantially all of the langbeinite and crystallize a portion of the langbeinite as leonite,
   separating the leonite from the potassium magnesium sufate mother liquor,
   mixing the potassium magnesium sulfate liquor with methanol to crystallize leonite therefrom, and
   separating the leonite from the methanol magnesium sulfate mother liquor.

4. The process of producing potassium sulfate from langbeinite comprising the steps of:
   hydrating langbeinite with water to dissolve substantially all of the langbeinite and crystallize a portion of the langbeinite as leonite,
   separating the leonite from the potassium magnesium sulfate mother liquor,
   mixing the potassium magnesium sulfate liquor with methanol to crystallize lenoite therefrom,
   separating the leonite from the methanol magnesium sulfate mother liquor,
   dissolving the leonite in water, removing water from the leonite solution to crystallize potassium sulfate from the solution, and separating the potassium sulfate from the magnesium potassium sulfate mother liquor.

5. The process of producing potassium sulfate from langbeinite comprising the steps of:
hydrating langbeinite with water to dissolve substantially all of the langbeinite and crystallize a portion of the langbeinite as leonite,
separating the leonite from the potassium magnesium sulfate mother liquor,
mixing the potassium magnesium sulfate liquor with methanol to crystallize leonite therefrom,
separating the leonite from the methanol magnesium sulfate mother liquor,
washing the leonite with magnesium potassium sulfate liquor resulting from a subsequent step to remove any langbeinite in the leonite,
dissolving the leonite in water,
removing water from the leonite solution to crystallize potassium sulfate from the solution,
separating the potassium sulfate from the magnesium potassium sulfate mother liquor and recycling the liquor to the leonite wash step, and
recycling the magnesium potassium sulfate liquor from the leonite washing step to the langbeinite hydrating step to provide water for dissolving the langbeinite.

6. The process of producing potassium sulfate and sodium sulfate from langbeinite and sodium chloride comprising the steps of:
hydrating langbeinite with water to dissolve substantially all of the langbeinite and crystallize a portion of the langbeinite as leonite,
separating the leonite from the potassium magnesium sulfate mother liquor,
mixing the potassium magnesium sulfate liquor with methanol to crystallize leonite therefrom,
separating the leonite from the methanol magnesium sulfate mother liquor,
dissolving the leonite in water,
removing water from the leonite solution to crystallize potassium sulfate from the solution,
separating the potassium sulfate from the magnesium potassium sulfate mother liquor,
mixing the methanol magnesium sulfate liquor with sodium chloride and additional methanol to crystallize sodium sulfate from the mother liquor, and
separating the sodium sulfate from the mother liquor.

7. The process of producing potassium sulfate and sodium sulfate from langbeinite and sodium chloride comprising the steps of:
hydrating langbeinite with water to dissolve substantially all of the langbeinite and crystallize a portion of the langbeinite as leonite,
separating the leonite from the potassium magnesium sulfate mother liquor,
mixing the potassium magnesium sulfate liquor with methanol to crystallize leonite therefrom,
separating the leonite from the methanol magnesium sulfate mother liquor,
dissolving the leonite in water,
removing water from the leonite solution to crystallize potassium sulfate from the solution,
separating the potassium sulfate from the magnesium potassium sulfate mother liquor,
mixing the methanol magnesium sulfate liquor with sodium chloride and additional methanol to crystallize sodium sulfate from the mother liquor,
separating the sodium sulfate from the mother liquor,
recovering the methanol from the sodium sulfate mother liquor, and
using the recovered methanol in treating subsequent potassium magnesium sulfate and methanol magnesium sulfate liquors.

8. The process of producing potassium sulfate and magnesium oxide from langbeinite comprising the steps of:
hydrating langbeinite with water to dissolve substantially all of the langbeinite and crystallize a portion of the langbeinite as leonite,
separating the leonite from the potassium magnesium sulfate mother liquor,
mixing the potassium magnesium sulfate liquor with methanol to crystallize the leonite therefrom,
separating the leonite from the methanol magnesium sulfate mother liquor,
dissolving the leonite in water,
removing water from the leonite solution to crystallize potassium sulfate from the solution,
separating the potassium sulfate from the mother liquor,
separating the methanol from the methanol magnesium sulfate liquor,
mixing the magnesium sulfate liquor with ammonia to crystallize magnesium hydroxide,
separating the precipitated magnesium hydroxide from the mother liquor, and
drying the magnesium hydroxide to magnesium oxide.

9. The process of producing potassium sulfate and magnesium oxide from langbeinite comprising the steps of:
hydrating langbeinite with water to dissolve substantially all of the langbeinite and crystallize a portion of the langbeinite as leonite,
separating the leonite from the potassium magnesium sulfate mother liquor,
mixing the potassium magnesium sulfate liquor with methanol to crystallize the leonite therefrom,
separating the leonite from the methanol magnesium sulfate mother liquor,
dissolving the leonite in water,
removing water from the leonite solution to crystallize potassium sulfate from the solution,
separating the potassium sulfate from the mother liquor,
separating the methanol from the methanol magnesium sulfate liquor,
mixing the magnesium sulfate liquor with ammonia to crystallize magnesium hydroxide,
separating the magnesium hydroxide from the mother liquor,
drying the magnesium hydroxide to magnesium oxide, and
recovering the ammonia from the mother liquor.

10. The process of producing potassium sulfate and magnesium oxide from langbeinite comprising the steps of:
hydrating langbeinite with water to dissolve substantially all of the langbeinite and crystallize a portion of the langbeinite as leonite,
separating the leonite from the potassium magnesium sulfate mother liquor,
mixing the potassium magnesium sulfate liquor with methanol to crystallize the leonite therefrom,
separating the leonite from the methanol magnesium sulfate mother liquor,
dissolving the leonite in water,
removing water from the leonite solution to crystallize potassium sulfate from the solution,
separating the potassium sulfate from the mother liquor,
separating the methanol from the methanol magnesium sulfate liquor,
mixing the magnesium sulafte liquor with ammonia to crystallize magnesium hydroxide,
separating the magnesium hydroxide from the magnesium ammonium sulfate mother liquor,
drying the magnesium hydroxide to magnesium oxide,
separating ammonium from the magnesium ammonium sulfate mother liquor,
removing water from the magnesium ammonium sulfate mother liquor to crystallize ammonium sulfate, and separating the ammonium sulfate from the mother liquor.

11. The process of producing potassium sulfate from langbeinite comprising the steps of:

hydrating langbeinite with water to dissolve substantially all of the langbeinite and crystallize a portion of the langbeinite as leonite, separating the leonite from the potassium magnesium sulfate mother liquor, mixing the potassium magnesium sulfate mother liquor with methanol to crystallize leonite therefrom, separating the leonite from the methanol magnesium sulfate mother liquor, dissolving the leonite in water, removing water from the leonite solution to crystallize potassium sulfate from the solution, separating the potassium sulfate from the magnesium potassium sulfate mother liquor, mixing the methanol magnesium sulfate liquor with potassium chloride and additional methanol to crystallize potassium sulfate, and separating potassium sulfate from the mother liquor.

12. The process of producing potassium sulfate from langbeinite comprising the steps of:

hydrating the langbeinite with water to dissolve substantially all of the langbeinite and crystallize a portion of the langbeinite as leonite, separating the leonite from the potassium magnesium sulfate mother liquor, mixing the potassium magnesium sulfate mother liquor with methanol to crystallize leonite therefrom, separating the leonite from the methanol magnesium sulfate mother liquor, dissolving leonite in water, removing water from the leonite solution to crystallize potassium sulfate from the solution, separating the potassium sulfate from the magnesium potassium sulfate mother liquor, mixing the methanol magnesium sulfate liquor with potassium chloride and additional methanol to crystallize potassium sulfate, separating potassium sulfate from the mother liquor, and recovering the methanol from the potassium sulfate mother liquor and using the recovered methanol in treating subsequent langbeinite and magnesium sulfate methanol liquors.

13. The process of producing potassium sulfate, magnesium oxide and ammonium sulfate from langbeinite comprising the steps of:

hydrating the langbeinite with water to dissolve substantially all of the langbeinite and crystallize a portion of the langbeinite as leonite, separating the leonite from the potassium magnesium sulfate mother liquor, mixing the potassium magnesium sulfate mother liquor with methanol to crystallize leonite therefrom, separating the leonite from the methanol magnesium sulfate mother liquor, dissolving the leonite in water, removing water from the leonite solution to crystallize potassium sulfate from the solution, separating the potassium sulfate from the magnesium potassium sulfate mother liquor, mixing a portion of the methanol magnesium sulfate liquor with ammonia to crystallize magnesium hydroxide, separating the magnesium hydroxide from the magnesium ammonium sulfate-ammonium hydroxide mother liquor, separating ammonia from said mother liquor, removing water from said mother liquor to crystallize ammonium sulfate, separating the ammonium sulfate from the ammonium sulfate mother liquor, drying a portion of the magnesium hydroxide to magnesium oxide, mixing the ammonium sulfate mother liquor and a portion of the magnesium hydroxide and water and recovering ammonia from the mixture, mixing the resulting magnesium sulfate liquor with a portion of the methanol magnesium sulfate liquor from a previous step with sodium chloride and additional methanol to crystallize sodium sulfate, and separating the sodium sulfate from the mother liquor.

14. The process of claim 13 wherein the methanol is recovered from the last named mother liquor and recycled to the sodium chloride reaction step and recycled to the leonite crystallization step.

15. The process of obtaining sodium sulfate from magnesium hydroxide and ammonium sulfate solution comprising:

distilling the solution to separate ammonia from the resulting magnesium sulfate liquor, mixing the resulting liquor with sodium chloride and methanol and crystallizing sodium sulfate, and separating the sodium sulfate from the motor liquor.

16. The process of producing leonite from langbeinite comprising the steps of:

hydrating langbeinite with water to dissolve substantially all of the langbeinite, mixing at least a part of the dissolved langbeinite with methanol, and separating the leonite resulting from the hydrating and methanol treatments from the mother liquor.

17. The process of producing potassium sulfate from langbeinite comprising the steps of:

hydrating langbeinite with water to dissolve substantially all the langbeinite, mixing at least a part of the dissolved langbeinite with methanol, separating the leonite resulting from the hydrating and methanol treatments from the mother liquor, dissolving the leonite in water, removing water from the leonite solution to crystallize potassium sulfate from the solution, and separating the potassium sulfate from the magnesium potassium sulfate mother liquor.

References Cited

UNITED STATES PATENTS

| 932,130 | 8/1909 | Hunter | 23—193 |
| 1,986,509 | 1/1935 | MacIntire | 23—201 |
| 2,437,182 | 3/1948 | Barr et al. | 23—121 |
| 3,003,849 | 10/1961 | Veronica | 23—121 X |

OSCAR R. VERTIZ, *Primary Examiner.*

E. C. THOMAS, *Assistant Examiner.*

U.S. Cl. X.R.

23—38, 121, 201